H. H. BATES.
TRACTOR.
APPLICATION FILED JAN. 16, 1914. RENEWED FEB. 18, 1916.
1,179,066.
Patented Apr. 11, 1916.
6 SHEETS—SHEET 1.
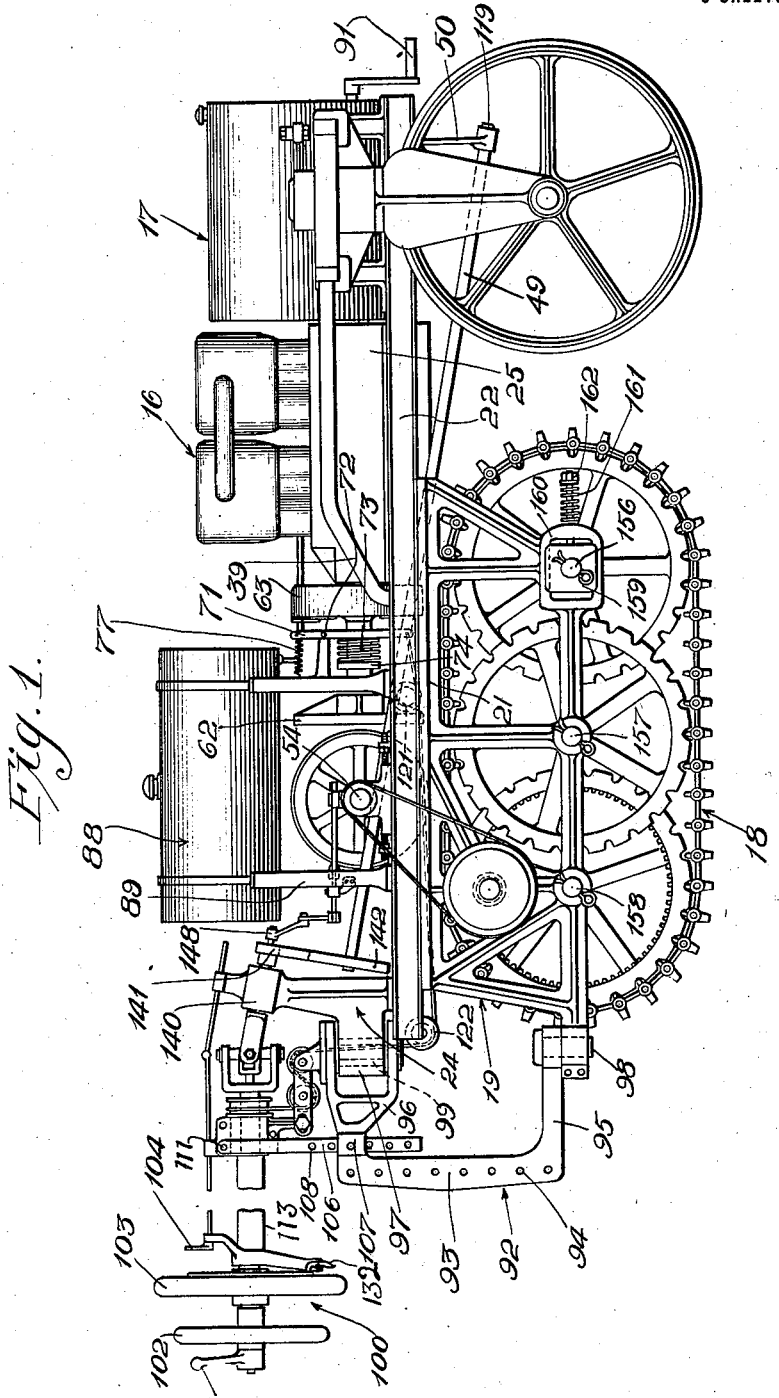

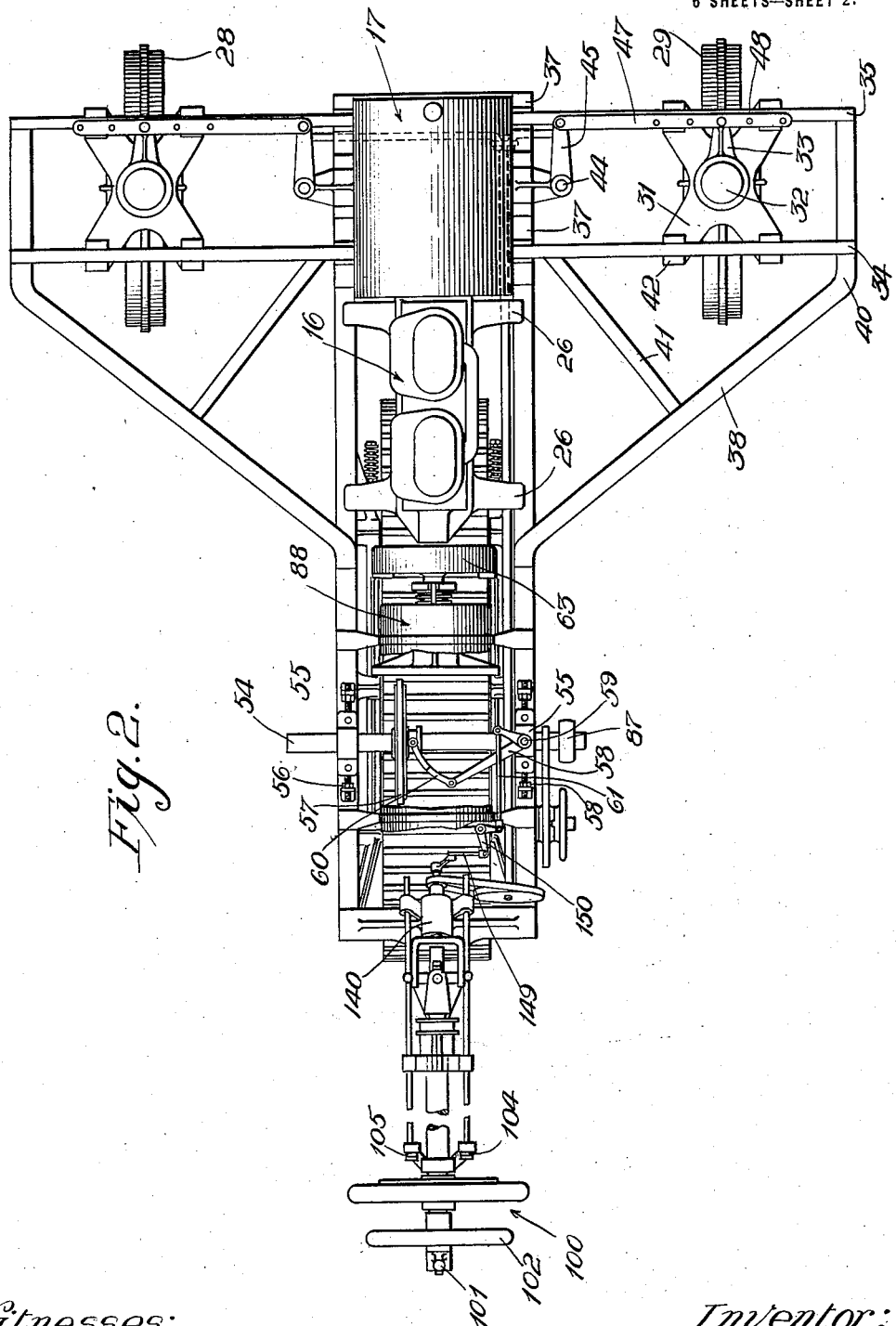

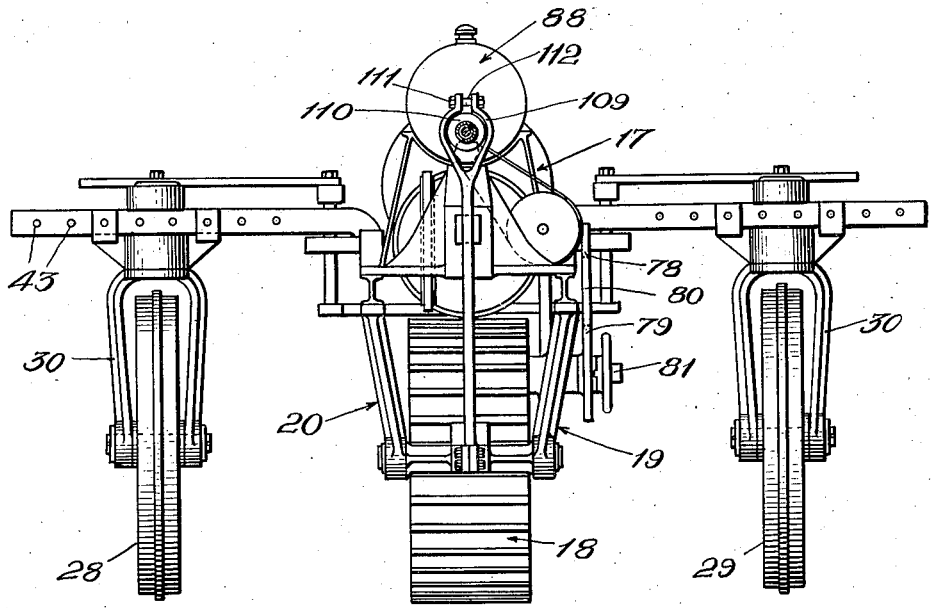
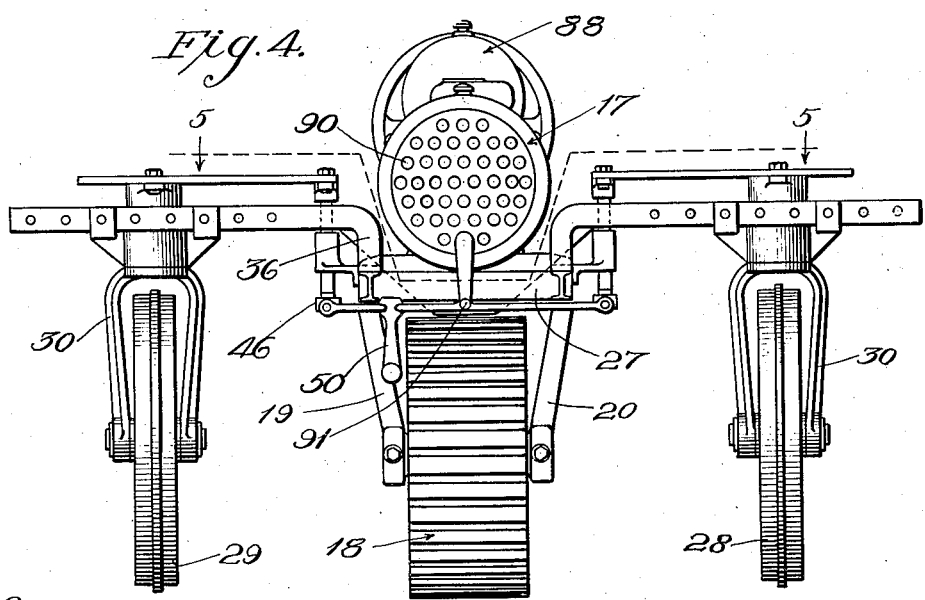

H. H. BATES.
TRACTOR.
APPLICATION FILED JAN. 16, 1914. RENEWED FEB. 18, 1916.
1,179,066.
Patented Apr. 11, 1916.
6 SHEETS—SHEET 4.
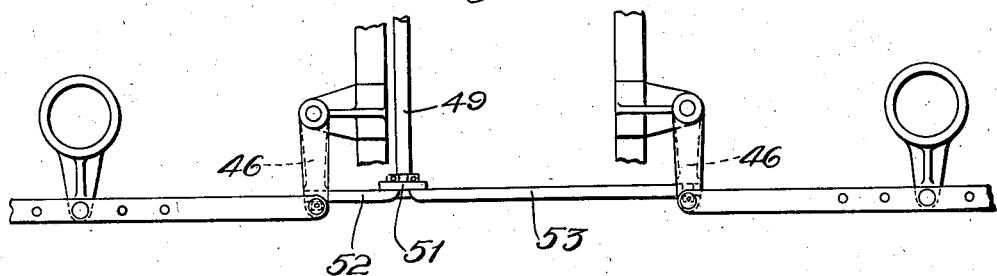
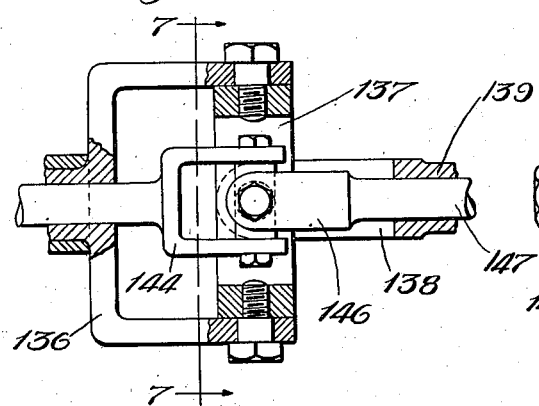
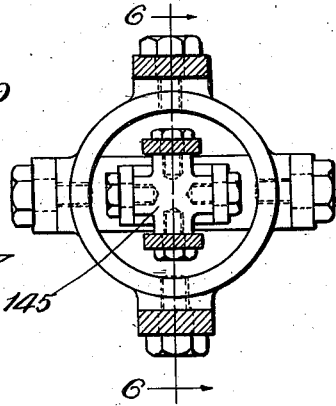
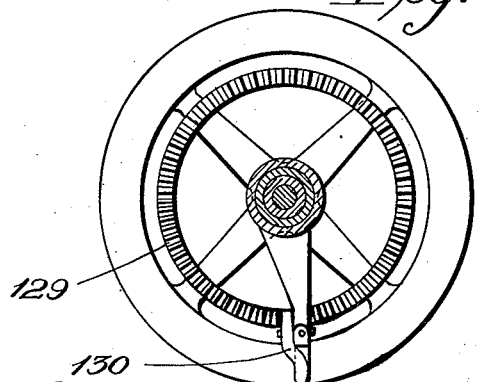
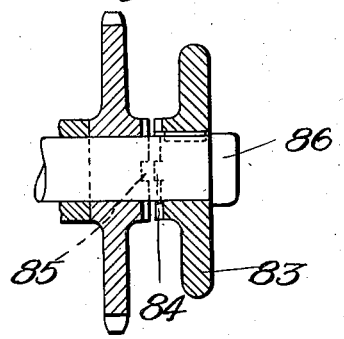
Witnesses:
Inventor:
Harry H. Bates
by Banning & Banning
Attys.

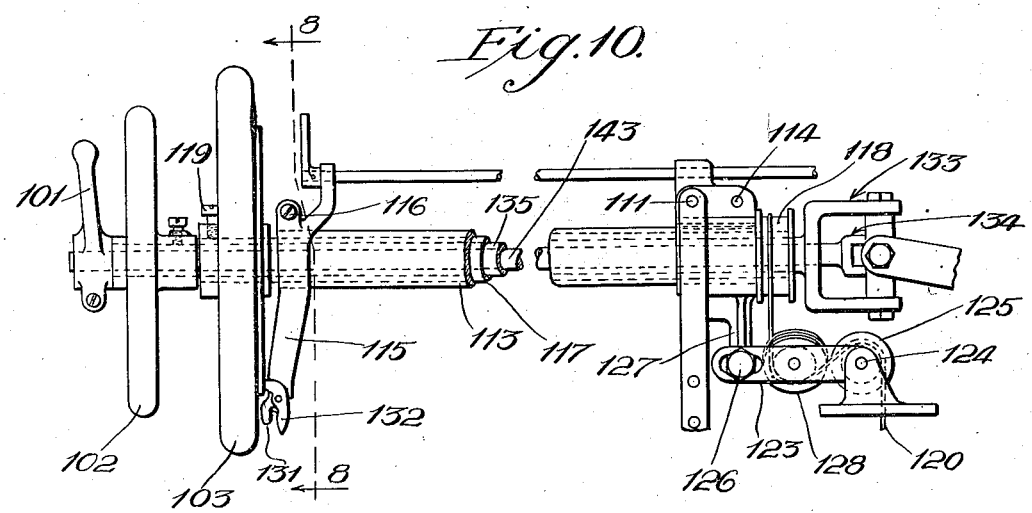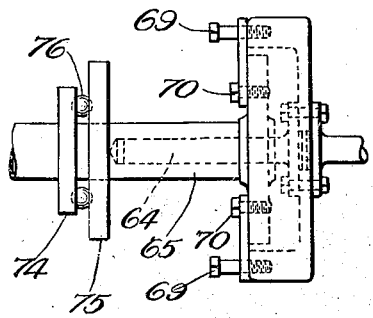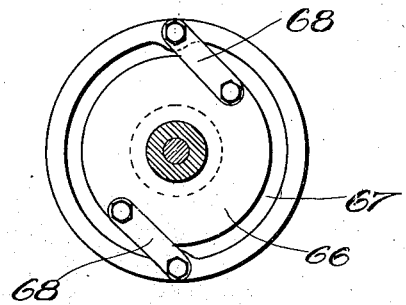

H. H. BATES.
TRACTOR.
APPLICATION FILED JAN. 16, 1914. RENEWED FEB. 18, 1916.
1,179,066.
Patented Apr. 11, 1916.
6 SHEETS—SHEET 6.
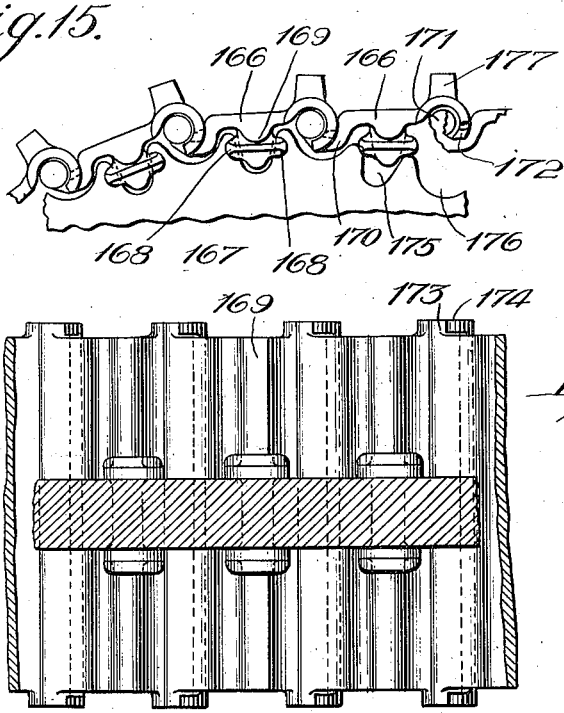

UNITED STATES PATENT OFFICE.

HARRY H. BATES, OF JOLIET, ILLINOIS, ASSIGNOR TO BATES MACHINE COMPANY, OF JOLIET, ILLINOIS, A CORPORATION OF ILLINOIS.

TRACTOR.

1,179,066.      Specification of Letters Patent.      Patented Apr. 11, 1916.

Application filed January 16, 1914, Serial No. 812,506. Renewed February 18, 1916. Serial No. 79,223.

*To all whom it may concern:*

Be it known that I, HARRY H. BATES, a citizen of the United States, residing at Joliet, in the county of Will and State of Illinois, have invented certain new and useful Improvements in Tractors, of which the following is a specification.

The present invention relates to certain improvements in tractors, and particularly to improvements in that type or form of tractor which is intended for use on the farm for pulling farm implements and the like.

Still more particularly certain features of the invention adapt the tractor to use in the pulling of cultivators, although it will presently appear that certain features of the invention may be applied equally well to tractors not intended for such use, or for that matter not intended for use in pulling farm implements.

Most forms of farm implements are provided with one or more levers or controlling devices, whose manipulation is necessary from time to time in order to successfully prosecute or carry forward the work of the implement. For example, a cultivator is provided with certain levers, which serve to control the depth of cut, and other levers, which serve to control the pitch or cutting angle of the disks. These levers must be manipulated from time to time during the progress of the work, and, therefore, it is practically imperative that an attendant should ride on the implement itself.

The main object of the present invention is to so construct the tractor, and particularly the control mechanism of the same, that the operator riding on the seat of the following implement can control all of the major functions of the tractor, including the steering, speed, starting, stopping, etc., from the seat of the implement. This will bring the control of all of the major functions of the tractor, as well as the usual implement functions, within convenient reach of the operator sitting on the seat of the implement, thereby dispensing with the necessity of a special operator to ride on the tractor in addition to the usual operator on the implement.

Another object of the invention has reference to the provision of a construction such that the tractor may be used with equal convenience and with equal advantage for the drawing of various kinds and sizes of implement. The draw bars or tongues of some implements stand higher than those of others, so that the point of application of the draw force varies with the type and size of the implement in question. In order to accommodate the tractor to this first fact, while still maintaining a direct horizontal pull on the draw bar, I have provided a tractor construction such that various heights of implement draw bar may be accommodated with equal facility and to equal advantage. In like manner, different types and sizes of implement are provided with operators' seats mounted at different elevations above the ground, and, therefore, in order to accommodate the tractor to this fact, so that it may be controlled from the different implements with equal facility, I have provided on the tractor a control mechanism of such construction, and have so associated or related the same to the other mechanisms of the tractor, that the control mechanism for the various major portions of the tractor may be operated throughout a wide range of elevations with equal facility and with equal certainty and positiveness of operation.

The tractor of the present invention is so constructed that it may be caused to easily follow sharp bends or turns in the direction of travel. This feature will give to it a facility and ease of operation rendering it useful in many classes of service from which other tractors are excluded. In order to permit of obtaining this result, it is desirable that the traction force developed by the tractor should be applied to the ground as close as possible to the turning point of the draw bar, and, therefore, another object of the invention is to so construct the tractor that the traction force will be developed substantially at the turning point of the draw bar.

Another object of the invention is to provide a tractor construction which shall be peculiarly well adapted for use in connection with cultivators and the like. For this purpose the tractor must be so constructed that it can travel along the cultivated rows without injury to growing plants and vegetation. For example, it should be so constructed that it can travel along the corn rows without injury to the standing corn. It is desirable, in order to secure facility of operation and control, and particularly in order to facilitate sharp bends or turns, that the point of application of the driving force should be centralized as much as possible, both with respect to the center line of the tractor fore and aft, and also with respect to the point of application of the driving force to the draw bar. Nevertheless, sufficient width of structure must be obtained to give the tractor stability and to prevent overturning. In order to obtain both of these advantages in combination, I prefer to use a centralized drive construction, such, for example, as that obtained with a "caterpillar", and to secure the necessary width of structure for stability and equilibrium by the use of a construction in which the forward wheels are placed relatively far apart. In order to secure the benefits of such an arrangement in combination with the benefits arising from a construction in which the machine may be adapted for use with different widths of cultivated rows, another object is to so mount the front wheels that they can be set at different distances from the center line of the structure, and to use said wheels for the steering wheels.

All of the foregoing objects go to the provision of a tractor intended for control from the rear, and particularly to the formation of a traction which may be used with equal facility for the pulling of various types and sizes of implement, and which may be controlled from the seat of such implement.

Other objects and uses will appear from a detailed description of the invention, which consists in the features of construction and combinations of parts hereinafter described and claimed.

In the drawing: Figure 1 shows a side elevation of the assembled tractor, the central portion of the control mechanism being broken away to indicate that the same may be of any length desired; Fig. 2 is a plan view of the assembled tractor; Fig. 3 is a back view of the same; Fig. 4 is a front view of the same; Fig. 5 is a plan view of the steering link mechanism, being taken on line 5—5 of Fig. 4, looking in the direction of the arrows; Fig. 6 is an enlarged longitudinal section through the double universal joint, being taken on line 6—6 of Fig. 7, looking in the direction of the arrows; Fig. 7 is a cross section, taken on line 7—7 of Fig. 6, looking in the direction of the arrows; Fig. 8 is an enlarged front view of the clutch control wheel, being taken on line 8—8 of Fig. 10, looking in the direction of the arrows; Fig. 9 is an enlarged cross section through the engaging and disengaging wheel, whereby the transmission mechanism is permanently connected to or disconnected from the caterpillar drive; Fig. 10 is an enlarged side view of the centralized control mechanism, with the central portion thereof broken away to show that it may be made of any desired length; Fig. 11 is an enlarged side view of the flexible connection between the engine fly wheel and the friction transmission wheel; Fig. 12 is a back face view of the construction shown in Fig. 11; Fig. 13 is a plan view of the caterpillar mechanism with the side frames in place, showing particularly how the caterpillar mechanism and side frames may be built into a unitary structure, to enable the draw pull to be transmitted to the draw bar with great directness; Fig. 14 is a plan view, looking at the inner faces of a number of the caterpillar links as the same are assembled together and set onto the driving wheels; and Fig. 15 is a side view of the structure shown in Fig. 14.

In the particular arrangement illustrated in the drawings I have shown a four cylinder gasolene engine 16 for supplying the driving power, and a radiator 17 is provided for cooling the same. However, it will presently appear that any suitable form of engine or prime mover may be used.

The caterpillar as an entirety is designated by the numeral 18. The detailed construction of this portion of the mechanism will be deferred until after certain other mechanisms have been described, and it will suffice at this point to say that the caterpillar is mounted between a pair of side frames 19 and 20 which are best shown in Figs. 1, 3, 4, and 13. Each of these side frames has a longitudinally extending rail or bar 21 in its upper portion which serves to support another longitudinally extending tractor frame bar 22 (see Fig. 1). From an examination of Fig. 1 it will be seen that the top bar 21 of the side frames 19 and 20 extend lengthwise of the major portion of the bars 22 so that these latter are reinforced by the side frames throughout the major portion of their length, and, as will presently appear, in that portion which is subjected to the greatest strains in service. A cross bar 23 joins together the lower portions of the rear ends of the side frames, and said cross bar may be integrally formed with the side frames or may be separately attached to them as desired. In the particular arrangement illustrated this cross piece is intergral with the side frames. The primary function of the cross piece 23 is to serve as a support for the lower end of the draw bar, but it also serves to space the lower portions of the rear ends of the side frames. The central portions of the side frames are spaced by the wheels which they carry, and by certain spacing tubes or sleeves, the detailed description of which will be deferred until the detailed construction of the caterpillar is described.

The upper portion of the side frames and the bars 22 are spaced and rigidly connected together in any desired manner, but in the particular arrangement illustrated I have availed myself of the presence of certain brackets used for the support of various mechanisms for securing this desired spacing and stiffness. For example, a bracket 24 in the rear portion of the structure serves as a mounting for the forward end of the control mechanisms. I avail myself of the presence of this bracket for rigidly spacing the rear ends of the bars 22 by widening out the lower portion of the bracket, as best shown in Fig. 3 and connecting such widened out portion to the rear ends of the bars 22; or for example I have provided the base portion 25 of the engine with outstanding lugs or arms 26 and then connect these lugs or arms to the bars 22 for rigidly spacing the same and connecting them together. In addition to the foregoing the front ends of the bars 22 may be connected in any desired manner; for example a spacing bar 27 may be used for this purpose, as well as other bars or devices, according to the convenience allowed by the particular construction in question.

In order to give stability to the structure and for the purpose of steering the same the front wheels 28 and 29 are provided. Each of these wheels is mounted in and carried by a fork or the like 30 and the upper end of each fork is journaled in a head 31. The journaling is effected by running a shaft or neck 32 of the fork up through the head, the upper end of the shaft or neck carrying a forwardly extending crank 33.

A pair of parallel frame bars or rods 34 and 35 extend sidewise at each side of the front of the frame structure. These pairs of frame bars are respectively supported by and guided by the front wheels, and it will presently appear that their major function is that of transmitting guiding forces from the front wheels as distinguished from transmitting a considerable load or weight to said wheels. The inner end 36 of each of the bars 34 and 35 is curved downwardly and enters between a pair of angles or the like 37 on the front portion of the corresponding side bars or rails 22. These angles serve to establish a rigid and effective connection between the bars 34 and 35 and the rails 22, so as to enable said bars to transmit the desired weight or load from the rails to the front wheels. However, in order to support the outer ends of the bars 34 and 35 I provide an angularly extending brace or the like 38 on each side of the frame, the inner ends 39 of these braces slanting or curving downwardly as best shown in Fig. 3 and being rigidly connected to the rails 22, while the outer ends 40 of the braces extend forwardly and are connected to the bars 34 and 35. Still other braces 41 extend forwardly and inwardly from the central portions of the braces 38 to the inner ends of the bars 34, so as to rigidly tie the several major elements together.

One of the main objects of the present invention is to provide a construction such that the front steering wheels may be moved from and toward the center line of the tractor in order to adapt the tractor to use in fields planted with rows at different distances apart. Therefore I have provided an adjustable connection between each of the heads 31 and the corresponding bars 34 and 35 so that the heads 31 may be set toward or from the center line of the machine. In the particular arrangement illustrated each of the heads 31 is provided at each corner a slotted portion 42 adapted to take onto the corresponding bar 34 or 35 and to seat against or grip the sides of the same. The bars 34 and 35 are each provided with a plurality of perforations 43 spaced according to the spacing of the portions 42 in such a manner that bolts or other connectors may be set through the portions 42 and the bars 34 and 35 when the heads 31 have been set to the desired spacing. By reason of the distance apart of the several portions 42 on each of the heads 31 it follows that a rigid connection will be established between each of said heads and the bars in any position in which the heads may be set.

In the forward portion of the frame structure a vertically extending rock shaft 44 is provided for each of the front wheels. The upper end of each of these shafts carries a crank or the like 45 while its lower end carries another crank 46. A pair of links 47 have their inner ends connected to the cranks 45, and their outer ends are provided with a series of perforations 48 corresponding in spacing to the perforations 43 so that in any position of each head 31 a pin or the like may be set through one of the perforations 48 and into the corresponding crank 33 to connect the same through the medium of the link to the corresponding crank 45. The cranks 45 are to be rocked for the purpose of steering the tractor, and it therefore follows that the steering may be properly effected when the front wheels are set at different distances apart.

A rock shaft 49 extends through the major portion of the length of the machine, and carries an upstanding crank 50 at its forward end. This upstanding crank has an enlarged upper end 51 adapted to take the inner ends of the links 52 and 53. The outer ends of these links take into the cranks 46 from which it follows that a rocking of the shaft 49 will serve to change the direction of the front wheels through the medium of the crank 50, links 52 and 53, cranks 46, rock shafts 44, cranks 45, links 47, and cranks 33. From an examination of Fig. 1 it will be seen that the shaft 49 slants downwardly from the rear toward the front of the machine, from which it follows that as the crank 50 is rocked it will have a certain angularity with respect to a vertical plane because the upper end of this crank will travel in a plane lying at right angles to the direction of the shaft 49. Moreover, the upper end of this crank will have a vertical angularity, that is as it swings toward either side of the center it will drop below the maximum elevation which it reaches when in the center. The first mentioned angularity will be largely, if not entirely, offset by the rearward travel of the front ends of the cranks 46 as they are rocked to either side of the center, depending upon the relative proportions and angles. The last mentioned or vertical angularity will be taken up or allowed for by reason of the link connections 52 and 53. By making the crank 50 of desired length as compared to other parts it will not be necessary for it to swing through more than a small angle in the ordinary steering operation so that the presence of this angularity will be of small consequence.

In the particular arrangement illustrated in the drawings I have shown a friction clutch and disk transmission, as this serves as a ready and simple means of securing the desired speed control and clutching and unclutching. It will be understood, however, that certain features of my invention are in no wise limited to the use of the foregoing. In the arrangement illustrated a transversely extending shaft 54 has its end portions journaled in the boxes 55 mounted on the side bars 22. These boxes 55 can be adjusted back and forth in any desired manner, and for this purpose I have illustrated the threaded pins 56. A friction wheel 57 is splined to the shaft 54 between the boxes 55 so that said wheel may be thrown into different driving positions. To effect this result a bell crank or the like 58 is pivoted to the frame at the point 59, one arm of said bell crank connecting to a fork 60, the bifurcated portion of which is pinned to a collar or sleeve which in turn connects to the friction wheel 57 so that as the bell crank is rocked the friction wheel will be drawn back and forth. A link 61 connects to the other arm of the bell crank and extends rearwardly. It therefore follows that speed changes will be effected by pulling and pushing on the rod 61.

A driving disk 62 is adapted to drive on to the periphery of the wheel 57, or to be withdrawn from the periphery of such wheel for disengaging purposes. The fly wheel of the engine is designated by the numeral 63. A small stub shaft or rod 64 extends rearwardly from the same, and the friction disk 62 is provided with a forwardly extending collar or sleeve 65 which slides easily on the stub shaft 64. The rear end of the collar 65 in turn is connected to a disk 66 which is conveniently illustrated as lying within a socket or recess 67 formed in the rear face of the fly wheel. A pair of diametrically opposite links 68 establish connection between the fly wheel and the disk 66 by means of the pins 69 and 70. These pins in turn have a loose connection to the link 68 so that the friction disk 62 with the sleeve 65 and disk 66 may be moved back and forth a slight amount for the purpose of engaging and disengaging the friction transmission without the necessity of shifting the plane of the fly wheel, and also without binding of parts.

Means must be provided for shifting the friction disk toward and from the friction wheel. For this purpose I have conveniently illustrated a forked arm or the like 71 pivoted to a stationary part at the point 72. A spring 73 is interposed between the forked arm and an enlargement or collar 74 of the sleeve 65 so that as the lower end of the forked bar is moved rearwardly the friction disk 62 will be thrown against the friction wheel by means of the spring compression. By reason of the fact that the disk and collar 74 are rapidly rotating while the forked arm is stationary it is desirable to interpose some anti-friction connection between the parts to permit of this rotation. For this purpose I have illustrated in Fig. 11 a collar or the like 75 loosely seated on the sleeve 65 and adapted to directly receive the thrust from the end of the spring while a ball-bearing connection 76 is interposed between the collars 74 and 75. A spring 77 may be provided for restoring the forked arm to its initial or inoperative position after the force exerted on its lower end has been relieved.

From the foregoing it will be seen that by exerting a backward pull on the lower end of the forked arm not only will the friction disk be thrown against the friction wheel, but also the amount of pressure thus exerted can be regulated or determined by the amount of pull on the lower end of the forked arm, and this amount of pull in pounds will be dependent upon the extent of movement because of the interposition of the compressible spring between the forked arm and the friction disk. Therefore, the farmer or other operator can control the frictional engagement according to his wishes by simply drawing the lower end of the forked arm rearward a greater or less amount. This is an important feature for the reason that the energy loss occasioned in a friction transmission is largely dependent upon or determined by the amount of pressure exerted, and, therefore, when the tractor is being used under light load the pressure can be reduced to an amount just sufficient to prevent slippage, while when a greater traction is to be developed the friction can be increased.

The shaft 54 carries a sprocket 78, best shown in Fig. 3, which sprocket in turn drives a sprocket 79 through the medium of a chain or the like 80. This sprocket is loosely mounted on a shaft 81 journaled in the side frame 19. The shaft 81 carries a pinion 82 at its inner end, and a hand wheel 83 which is splined to the outer end of the shaft as best shown in Fig. 9. This hand wheel in turn is provided with a lug or lugs 84 adapted to take into two corresponding grooves or recesses 85 of the sprocket 79 so that when the hand wheel is forced home to bring it into locked engagement with the sprocket the shaft 81 will be driven. It is therefore evident that this hand wheel serves as a means for clutching and unclutching the chain drive to the pinion 82. If desired, the outer end of the shaft 81 may be enlarged as at 86 in Fig. 9 in order to prevent the hand wheel from slipping off from the shaft.

From an examination particularly of Figs. 2 and 3, it will be seen that the shaft 54 projects some distance beyond the side frame 19. This projecting portion may be provided with a pulley 87 for use in driving other machines, such as threshers and the like, at which time the hand wheel 83 should be disengaged in the manner above described.

A fuel and lubricator tank 88 may be mounted at any convenient point on the structure, but I prefer to mount the same directly over the transmission mechanism, as best shown in Figs. 1 and 3. When thus mounted it may be supported by means of brackets 89 extending between the side bars 22.

The radiator 17 which was previously mentioned may be of any suitable construction. As a simple means I have illustrated the same as comprising front and rear heads extending between which are a number of air flues 90 through which the cooling air passes. The engine shaft or a continuation of the same may be carried forward through the lowermost of these flues and provided with a crank 91 for bringing the engine into operation.

The draw bar 92 is best shown in Fig. 1. In order to permit the tractor to be used conveniently in connection with implements having their tongues or draw bars located at different elevations the tractor draw bar is constructed in the form of a vertical bar 93 having a plurality of perforations 94 into the desired one of which the implement may be connected. This vertically extending bar has the forwardly extending arms 95 and 96, the former of which connects into the cross member 23 extending between the side frames 19 and 20, and the latter of which connects to a rearwardly extending lug 97 of the bracket 24. These connections of the arms 95 and 96 are pivotal in character so that the draw bar 93 may swing back and forth when the tractor takes a curve. The pivotal connection of the arm 95 may be in the form of a bolt or the like 98 but the pivotal connection of the arm 96 is preferably in the form of a hollow rod or tube 99, the perforation of which is used for accommodation of a clutch cord to be presently described.

By mounting the cross piece 23 immediately behind the caterpillar the pivotal connection of the draw bar may be effected immediately behind the caterpillar as illustrated so that the point of application of the traction force will be brought as close as possible to the point about which the draw bar swings when taking a curve. That is to say, the center of application of the traction force communicated by the caterpillar is thus brought as close as possible to the pivotal centers 98 and 99.

I shall now proceed to describe that portion of the disclosure which has reference to the mounting of the control mechanisms for the several major functions in such a position that the operator can conveniently reach them from the seat of the following implement. This control mechanism is best shown in Figs. 1, 2, and 10. It is designated in its entirety by the numeral 100. The handle 101 serves to control the speed, the wheel 102 is used for steering and the wheel 103 is used during the clutching and unclutching operations and also for securing the desired amount of pressure according to amount of frictional engagement necessary at any given time. In addition to the foregoing, the levers 104 and 105 serve to control the gas and spark respectively. All of these mechanisms are to be so mounted that their elevation can be adjusted according to the elevation of the driver's seat of the following implement, and are to be so constructed that they can be set farther forward or back as may be necessary according to the position of the driver's seat. In order to secure the elevational adjustments mentioned I have provided a vertically adjustable bar 106 which works within a throat 107 in the upper arm 96 of the draw bar. This bar 106 is provided with a plurality of perforations 108 so that it may be secured at any desired elevation by means of a pin passed through the throat and through the desired perforation. The upper portion of the bar 106 is flared outward to provide a yoke 109 within which there is mounted a sleeve or collar 110 as best shown in Figs. 1, 3, and 10. This collar is pivotally connected to the yoke by a pin 111 which runs through an upstanding lug 112 of the collar. The collar in turn is split and receives a tubular section 113 which may be clamped in place by tightening up a nut or the like 114 to clamp the collar. The tubular section serves to give a rigid mounting for the various controlling elements which are passed through it, and it also carries at its outer end a downwardly depending arm 115 which is split and clamped to the sleeve by means of a nut or screw 116.

A tube 117 is loosely mounted within the tube 113, and its inner end carries a pulley 118 while its outer end carries the clutch wheel 103. The clutch wheel in turn is rigidly connected to the tube 117 by a set screw 119 or in any other desired manner. The pulley 118 serves to wind and unwind a cord 120 or the like by means of which the bifurcated arm 71 is swung for the purpose of clutching and unclutching the engine drive. This cord is connected to the lower end of the bifurcated arm and runs over pulleys 121 and 122 and up through the perforation in the pivotal bearing 99. A lever arm 123 is pivoted at the point 124 immediately to the rear of the center of the opening of the bearing 99, a pulley 125 being mounted on this pivotal connection in such position that the periphery of the pulley is tangential with respect to the opening in the bearing 99. The outer end of the lever arm is carried by a pin and slot connection 126 with a downwardly depending lug 127 of the sleeve 110. The lever arm carries a pulley 128 in its central portion, this pulley being tilted, as best shown in Fig. 10, so that its periphery lies in a plane which is tangential to the pulley 118. It thus follows that the cord 120 may be led over the pulleys and will feed properly on to and off from the winding pulley 118.

On account of the pin and slot connection 126 it follows that as the tube 113 is rocked about the pivotal point 111 the pin will ride back and forth in the slot, and that the same action will take place when the bar 106 is raised or lowered to change the elevation of the controlling mechanism. It will be seen, however, that the cord will properly feed or take onto the pulley 118 regardless of the foregoing changes or adjustments.

After the friction disk has been drawn up against the friction wheel through the instrumentalities just discussed, the same must be held in this condition as long as the driving connection is to be maintained. In order to relieve the driver or operator of the burden of manually holding the disk in such position I have provided mechanical means for accomplishing this result. In the particular arrangement illustrated the forward face of the clutch wheel 103 is provided with a circular ratchet 129 adapted to be engaged by a pawl or dog 130. The latter in turn is carried by the arm 115 mounted on the stationary sleeve 113. A spring 131 normally presses the dog into engagement with the rack. The dog is, however, provided with a finger piece 132 which can be conveniently reached by a finger of the hand grasping the wheel 103, so that the dog can be unclutched without letting go of the wheel. With the foregoing arrangement the operator simply turns the wheel 103 in the proper direction for winding the cord 120 until a sufficient pressure is established between the friction wheel and disk. The dog then serves to maintain this condition until it is purposely tripped. If the operator desires to increase the friction he may hitch the wheel 103 over the desired number of notches, and vice versa, immediately allowing the wheel to run back if he desires to decrease the friction.

Operative connections must be established between the steering wheel 102 and the shaft 49, and between the arm 101 and the link 61 respectively. These connections must be centralized in such a manner that they will properly function regardless of the changes or adjustments which are effected from time to time in the height of the bar 106. In the particular arrangement illustrated I have shown such a centralized arrangement in the form of a pair of concentric universal joints adapted to change direction of movement in the same vertical line on which the draw bar swings from side to side. These are the universal joints 133 and 134 respectively, the former transmitting the steering force and the latter transmitting the speed change control forces. These universal joints are illustrated in detail in Figs. 6 and 7. The steering wheel 102 is keyed or otherwise secured to a sleeve 135 working loosely within the sleeve 117, the outer end of the sleeve 135 carrying a fork 136. This fork has its arms pivoted to a ring 137 at diametrically opposite points, the ring in turn being pivoted to the arms of another fork 138 also at diametrically opposite points. The fork 138 is shown as being at right angles to the fork 136. The fork 138 is secured to, or comprises a portion of a sleeve 139 journaled in a bearing 140 of the standard or bracket 24. The inner end of the sleeve 139 carries a sprocket 141 which drives the shaft 49 through the medium of another sprocket 142 and a chain. The sleeve 139 is shown as being journaled in such a manner as to lie parallel to the shaft 49 so as to secure a direct transmission of force. It will be evident from the foregoing that the operation of the steering wheel 102 will serve to rock the front wheels for steering purposes.

The change speed handle 101 is keyed or otherwise secured to a rod 143 which turns loosely within the sleeve 135, and the inner end of which carries a fork 144. This fork has its arms pinned or pivoted to a block 145, and another fork 146 has its arms pivoted to the same block. This last mentioned fork is connected to or is a continuation of a rod 147 which is loosely mounted within the sleeve 139, and the inner end of which rod carries a downwardly depending crank 148. This crank operates on a link 149 best shown in Fig. 2, which in turn is connected to the link 61 through the medium of a bell crank 150. Rocking the lever 101 therefore serves to shift the friction wheel 57 back and forth along the shaft 54 to which it is splined for the purpose of controlling the speed of the driven member of the transmission.

The finger pieces 104 and 105 for controlling the gas and spark respectively, are illustrated as being extensions of rods which run parallel to the sleeve 110 and have their inner ends journaled in the upper portion of the sleeve 110. It is not as necessary to provide an accurate universal joint connection for the gas and spark control as are necessary for the control of the other functions because the rods on which the finger pieces 104 and 105 are mounted may be allowed a certain amount of back and forth sliding as the position of the control mechanism is changed or adjusted from time to time. The gas and spark are controlled by rocking their respective finger pieces.

By reason of the fact that the forked rod 106 is mounted in or carried by a portion which is rigid with respect to the draw bar it follows that the controlling mechanisms will always maintain the same direction of travel as the draw bar. Therefore, these controlling mechanisms will maintain a constant position with respect to the seat of the following implement so that they will always be within the same convenient reach of the operator. This is an important consideration when it is understood that it would be extremely difficult for the operator to properly control the various functions in case the control handles and wheels were constantly shifted with respect to the control seat in the taking of curves. Furthermore, this arrangement insures a firm and unyielding support for the various control mechanisms by reason of the fact that the sleeve 113 is rigidly clamped by the split sleeve 110. In other words, this sleeve 113 serves as a solid bearing for all of the controlling mechanisms projecting to the rear of the tractor.

The caterpillar construction is best shown in Figs. 1, 13, 14, and 15. It comprises a forward wheel 151, a rear wheel 152, center wheels 153 and 154 and the chain 155. The forward and rear wheels are centered on the center line of the chain, while the middle wheels 153 and 154 ride on the side portions of the chain. These last mentioned walls straddle the forward and rear wheels, this fact being well shown in Fig. 13. The several wheels are mounted upon the shafts 156, 157, and 158, said shafts in turn being suitably journaled in the side frames 19 and 20. The center and rear shafts are illustrated as extending through rigid boxes and being held in place by cotter pins, while the forward shaft 156 is shown as extending through boxes 159 mounted to slide back and forth in yokes 160 of the side frames. These boxes are flanged on their outer faces so that they cannot move inwardly beyond the yokes 160, and they are held against pulling away from the yokes and from the shaft 156 by means of cotter pins. Springs 161 draw the boxes 159 forwardly, the tension of the springs being adjustable in any desired manner, as by means of nuts 162. The forward and rear wheels are centered with respect to the side frames and with respect to the chain by means of sleeves 163. A sleeve 164 is set between the center wheels 153 and 154 to space them apart the proper distance and hold them up against the side frames. In the arrangement illustrated the driving is effected through the medium of the rear wheel 152. For this purpose said wheel carries an internal gear 165 which meshes with the pinion 82 as previously described.

By arranging the wheels in the manner above described, that is by having the center wheels 153 and 154 straddle the forward and rear wheels it is possible to bring the forward and rear shafts 156 and 158 closer together than would otherwise be possible, thereby making it possible to shorten the overall length of the caterpillar and concentrating the traction as near as possible to the pivotal point on which the draw bar swings. Nevertheless, by widening out the chain to receive the center wheels 153 and 154 a sufficient width of caterpillar is obtained to give the necessary foundation area according to the permissible load per square foot. At the same time the load is transmitted from the side frames to substantially the entire area of the chain, thereby reducing the bending forces imposed on the links of the chain to a comparatively low degree. Figs. 14 and 15 illustrate the detailed construction of the chain itself. The same comprises the links 166, each of which is made the full width of the caterpillar. The center portion of each link is provided with an upstanding lug 167 of width substantially equal to that of the front and rear wheels 151 and 152. The side portions of these lugs 167 are provided with the arms 168 which are adapted to embrace the gears 151 and 152 in order to keep the chain properly centered. Each link is provided with a rib 169 which extends to its edge on each side, and serves to give the link additional rigidity and strength. One edge of each link is carried upward in a curved portion 170, which in turn terminates in a downwardly depending rib or bead 171 extending throughout the entire width of the link. The forward end of each link is provided with a hooked portion 172 adapted to engage the bead of the rear portion of the adjacent link substantially the entire width of the same. The bead 171 of each link projects a slight distance beyond the edge of the link to provide a knob 173 at each side of the link, and each of the hooked portions 172 is carried up at each side of the link to provide a finger 174 adapted to take onto the corresponding knob. However, it will be evident that the links are hooked or engaged together throughout their entire length. The hooks 174 and knobs 173 serve to prevent the links from slipping sidewise with respect to each other and thus serve to keep the chain traveling as a unitary structure.

The forward and rear wheels 151 and 152 are provided with deep pockets or recesses 175 adapted to receive the lugs 167 of the links, and are provided with intermediate shallow pockets 176 to accommodate the upwardly curved portions 170 at the ends of the links. As shown in Fig. 1 the center wheels 153 and 154 are also provided with shallow pockets for the accommodation of the upwardly curved portions 170.

In order to insure firmer grip on the ground over which the tractor may be passing I provide a knuckle 177 on the hooked end of each link, or I may provide a series of such knuckles extending the entire width thereof.

From a study of the foregoing disclosures it is seen that I have provided a construction in which all of the elements for controlling the major functions of the tractor are brought together or centralized at the rear of the tractor where they can be conveniently reached by an operator on a following implement. More especially it will be seen that the construction is such that these major functions can be conveniently controlled by elements within easy reach of the operator as he sits on the seat of the following implement. These features, taken in conjunction or combination with the feature of ability to adjust the controlling mechanisms vertically according to the height of the seat on the following implement, and in conjunction with the feature that the controlling mechanisms swing from one side to the other with the draw bar in taking curves, and the feature of a draw bar so constructed that it will readily receive draw bars or rods at various heights on various classes of following implements as well as other features, go to the production of a unitary structure peculiarly adapted to control from the seat of the following implement. It will also be seen that I have combined all of the foregoing with the feature of adjustability of the forward wheels according to the distance between cultivated rows, thereby adapting the tractor peculiarly well to certain classes of service.

While I have herein shown and described the features of my invention as applied in only a single particular construction, still it will be apparent to those skilled in the art that many other changes and modifications may be made without departing from the spirit of my invention. Therefore I do not limit myself to the particular construction of the disclosures as illustrated, but include within the scope of my invention many other equivalent constructions operating in equivalent manners to produce equivalent results.

I claim:

1. In a tractor the combination with the prime mover and steering wheel, of a draw bar pivoted to the rear portion of the tractor to swing about a vertical pivot, a rearwardly extending member on the draw bar, controlling mechanisms mounted on said member, and operative connections from said mechanisms to the prime mover and to the steering wheel.

2. In a tractor the combination with the prime mover and steering wheel, of a draw bar pivotally connected to the rear portion of the tractor to swing about a vertical pivot, a rearwardly extending member carried by the draw bar, controlling mechanisms carried by said member, and operative connections from the controlling mechanisms to the prime mover and to the steering wheel.

3. In a tractor the combination with the prime mover and steering wheel, of a draw bar pivoted to the rear portion of the tractor to swing about a vertical pivot, a rearwardly extending member carried by the draw bar and adjustable in a vertical direction, controlling mechanisms carried by said member, and operative connections from said mechanisms to the prime mover and to the steering wheel.

4. In a tractor the combination with the prime mover and steering wheel, of a draw bar pivoted to the rear portion of the tractor to swing about a vertical pivot, a rearwardly extending member carried by the draw bar and swinging with the same, controlling mechanisms mounted on said member, and operative connections from the controlling mechanisms to the prime mover and to the steering wheel.

5. In a tractor the combination with the prime mover and steering wheel, of a draw bar pivoted to the rear portion of the tractor to swing about a vertical pivot, a rearwardly extending member carried by the draw bar and swinging with the same, said member being adjustable in a vertical direction, controlling mechanisms carried by said member, and operative connections from the controlling mechanisms to the prime mover and to the steering wheel.

6. In a tractor the combination with the prime mover and steering wheel, of a draw bar pivoted to the rear portion of the same to swing about a vertical pivot, a rearwardly extending member mounted on and swinging with the draw bar, the rear end of said member being adjustable vertically with respect to the draw bar, controlling mechanisms carried by said member, and operative connections from the controlling mechanisms to the prime mover and to the steering wheel.

7. In a tractor the combination with the prime mover and steering wheel, of a draw bar pivoted to the rear portion of the tractor to swing about a vertical pivot, a rearwardly extending member having its forward end pivotally mounted with respect to the draw bar, controlling mechanisms carried by said member, and operative connections from said controlling mechanisms to the prime mover and to the steering wheel.

8. In a tractor the combination with driving means and steering means, of a draw bar, pivotal connections between the upper and lower ends of the draw bar and the tractor to permit the draw bar to swing about a vertical pivot, a member rearwardly extending from the tractor and swinging with the draw bar, controlling mechanisms on said member, and operative connections from the controlling mechanisms to the driving means and to the steering means.

9. In a tractor the combination with driving means and steering means of a draw bar pivoted to the rear portion of the tractor to swing about a vertical pivot, a controlling element carried by the rear portion of the tractor, a rearwardly extending member mounted on and carried by the draw bar, controlling mechanisms on said member, and operative connections from the controlling mechanisms to the controlling mechanism mounted on the rear portion of the tractor.

10. In a tractor the combination with driving means and steering means, of a draw bar pivotally connected to the rear portion of the tractor to swing about a vertical pivot, a vertically adjustable member carried by the draw bar and swinging with the same, controlling mechanisms mounted to the rear of said member, said member serving to support the controlling mechanisms, and operative connections from the controlling mechanisms to the driving means and to the steering means.

11. In a tractor the combination with the driving means and steering means, of a draw bar pivotally connected to the rear portion of the tractor to swing about a vertical pivot, a vertically adjustable part carried by the draw bar and swinging with the same, a member mounted on and carried by said part and swinging with the same, said member being swingingly mounted, controlling mechanisms mounted to the rear of said member, and operative connections from the controlling mechanisms to the driving means and to the steering means.

12. In a tractor the combination with driving means and steering means, of a vertically adjustable part connected to the rear portion of the tractor, a member pivoted to said part to swing about a vertical pivot, controlling mechanisms mounted to the rear of said member and swinging with the same, and operative connections from the controlling mechanisms to the driving means and to the steering means.

13. In a tractor the combination with driving means and steering means, of a vertically adjustable part swingingly connected to the rear portion of the tractor, a member pivoted to said part and capable of swinging about a horizontal pivot, controlling mechanisms mounted to the rear of said member, and operative connections from the controlling mechanisms to the driving means and to the steering means.

14. In a tractor the combination with the prime mover and steering wheel, of a draw bar connected to the rear portion of the tractor, a rearwardly extending member on the draw bar, controlling mechanisms mounted on said member, and operative connections from said mechanisms to the prime mover and to the steering wheel.

15. In a tractor the combination with the prime mover and steering wheel, of a draw bar connected to the rear portion of the tractor, a rearwardly extending member connected to the draw bar, controlling mechanisms mounted on said member, and operative connections from said mechanisms to the prime mover and to the steering wheel.

16. In a tractor the combination with the prime mover and steering wheel, of a draw bar on the rear portion of the tractor, a rearwardly extending member connected to the rear portion of the draw bar, controlling mechanisms mounted on said member, and operative connections from said mechanisms to the prime mover and to the steering wheel.

17. In a tractor the combination with a prime mover and a guide wheel, of a rearwardly extending member pivotally connected to the rear portion of the tractor and capable of swinging either horizontally or vertically with respect to said pivoted connection, a steering wheel and prime mover controlling devices carried by said member, and suitable connections from the steering wheel to the guide wheel and from the prime mover controlling devices to the prime mover to permit said rearwardly extending member to swing either horizontally or vertically while maintaining said operative connections.

18. In a tractor the combination with a prime mover and a guide wheel, of a rearwardly extending member pivoted to the rear portion of the tractor and capable of swinging either horizontally or vertically on said pivoted connection, a steering wheel and prime mover controlling devices carried by said member, operating connections from the steering wheel to the guide wheel and from the prime mover controlling devices to the prime mover, and means for adjusting the rearwardly extending member into different vertical adjustments.

19. In a tractor the combination with a prime mover and a guide wheel of a rearwardly extending member pivotally connected to the rear portion of the tractor, a steering wheel and prime mover controlling devices carried by the end portion of said member, operative connections from the steering wheel to the guide wheel and from the prime mover controlling devices to the prime mover, said operative connections serving to operatively connect the parts in various positions of horizontal or vertical adjustment of the rearwardly extending member, and means for securing said member in various positions of vertical adjustment.

20. In a tractor the combination with the prime mover and steering wheel, of a vertically adjustable part connected to the rear portion of the tractor, a member mounted on and carried by said part, said member being swingingly mounted, controlling mechanisms mounted to the rear of said member, and operative connections from the controlling mechanisms to the driving means and to the steering means.

21. In a tractor the combination with the driving means and steering means, of a vertically adjustable part connected to the rear portion of the tractor, a rearwardly extending support carried by said part, controlling mechanisms on the rear end of said support, and operative connections from said controlling mechanisms to the driving means and to the steering means.

22. In a tractor the combination with the driving means and steering means, of a vertically adjustable part connected to the rear portion of the tractor, means for securing said part in any desired position of vertical adjustment, a rearwardly extending support mounted on and carried by said part, controlling mechanisms mounted on the rear end of said support, and operative connections from said controlling mechanisms to the driving means and to the steering means.

23. In a tractor the combination with the driving means and steering means, of a rearwardly extending support having its forward end connected to the rear portion of the tractor, controlling mechanisms mounted on and carried by the rear portion of said support, and operative connections from said controlling mechanisms to the driving means and to the steering means.

24. In a tractor, the combination with the driving means and steering means of a support located to the rear of the tractor, controlling mechanisms connected to said support, and operative connections from said controlling mechanisms to the driving means and to the steering means.

25. In a tractor, the combination with the driving means and steering means of a support located to the rear of the tractor, controlling mechanisms connected to said support, and flexible operative connections from said controlling mechanisms to the driving means and to the steering means, the support being movable both horizontally and vertically with respect to the tractor, and said connections permitting movement between the controlling mechanisms and the driving means and steering means while maintaining said operative connections.

26. In combination with the steering means of a tractor, a steering device located to the rear of the tractor, a flexible operative connection from said steering device to the steering means, said connection permitting movement between the steering device and the tractor both horizontally and vertically while maintaining said operative connection, and means for supporting the steering device.

27. In combination with the steering means of a tractor, a steering device located to the rear of the tractor, a flexible operative connection from the steering device to the steering means, said connection permitting movement between the steering device and the tractor in a desired direction while maintaining said operative connection, and means for supporting the steering device.

HARRY H. BATES.

Witnesses:
THOMAS A. BANNING, Jr.,
EPHRAIM BANNING.